No. 639,929. Patented Dec. 26, 1899.
F. O. McQUEEN.
ACETYLENE GAS GENERATOR.
(Application filed Apr. 17, 1899.)
(No Model.)
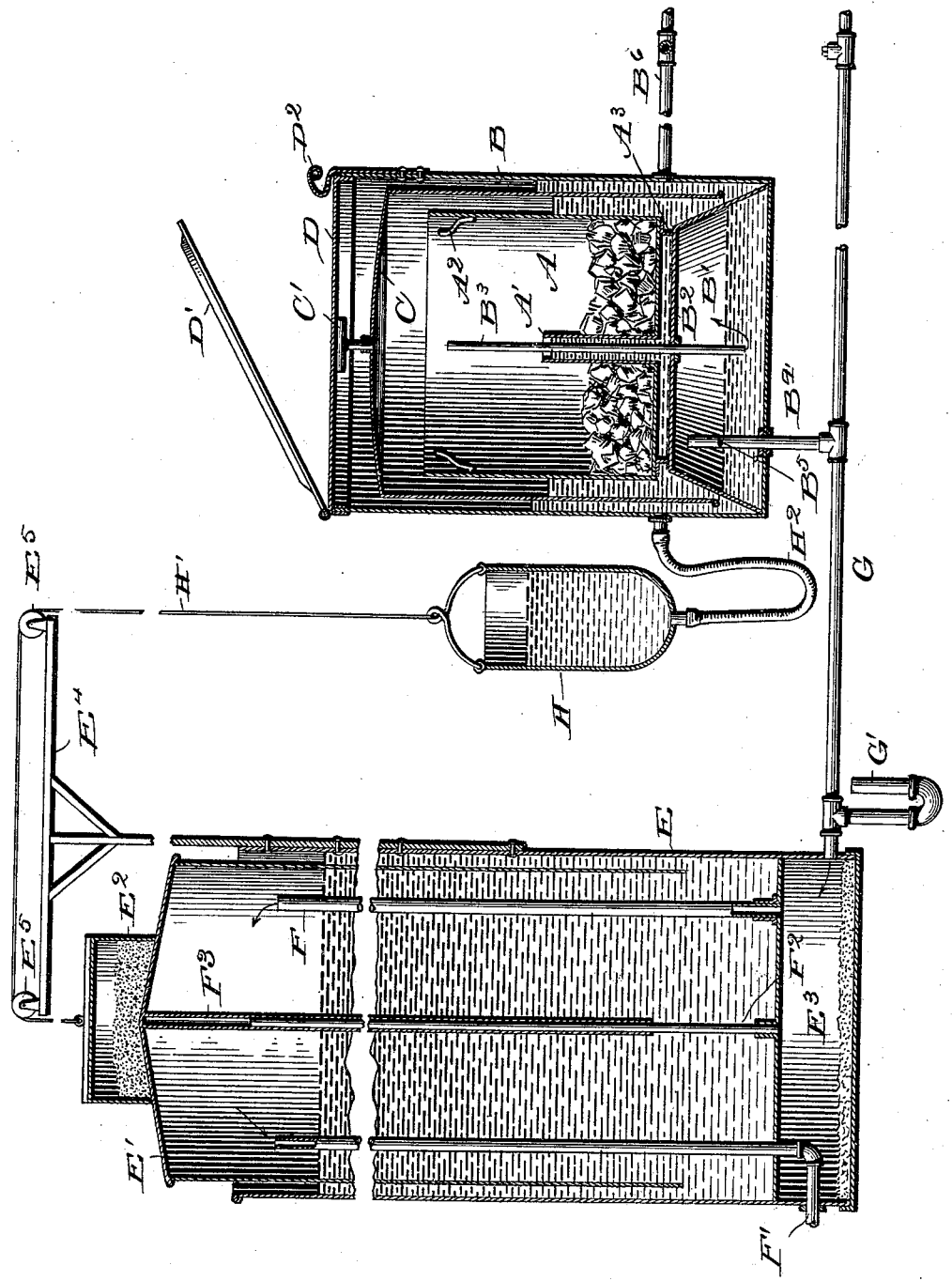
Witnesses
L. C. Hills
Alfred T. Gage.
Inventor
Frank O. McQueen,
By E. B. Stocking
Attorney

UNITED STATES PATENT OFFICE.

FRANK O. McQUEEN, OF SCOTTSBURG, INDIANA.

ACETYLENE-GAS GENERATOR.

SPECIFICATION forming part of Letters Patent No. 639,929, dated December 26, 1899.

Application filed April 17, 1899. Serial No. 713,432. (No model.)

*To all whom it may concern:*

Be it known that I, FRANK O. McQUEEN, a citizen of the United States, residing at Scottsburg, in the county of Scott, State of Indiana, have invented certain new and useful Improvements in Gas-Generators, of which the following is a specification, reference being had therein to the accompanying drawing.

This invention relates to gas-generators, and particularly to a generating-chamber for use in connection with that class of apparatus.

The invention has for its object to simplify and improve the construction of the generating-chamber, so that a series of the same can be connected to a main and the gas generated therefrom discharged into a suitable gasometer.

A further object of the invention is to provide a carbid-receptacle which is readily removable from the generating-chamber and when used in connection with said chamber provides an outlet for the gas, which prevents any back pressure from the main when the chamber is open and also washes the gas as the same passes into the main.

Other objects and advantages of the invention will hereinafter appear in the following description and the novel features thereof will be particularly pointed out in the appended claim.

In the drawing I have illustrated a vertical cross-section through the generating-chamber and the gasometer operatively connected therewith.

Like letters of reference indicate like parts throughout.

The letter A represents a removable carbid-receptacle, which is provided with an upwardly-extending tube or pipe A′, terminating about midway its height. The receptacle is provided with suitable handles $A^2$ to facilitate its removal and upon its lower surface with supporting-feet $A^3$, which permit a circulation of the water beneath the bottom of the receptacle to cool the same. The receptacle is located within a generating-chamber B, which chamber is provided at its lower portion with a water or liquid seal chamber B′, the upper wall $B^2$ of which supports the carbid-receptacle. This wall $B^2$ also supports a vertically-extending gas-pipe $B^3$, which extends upwardly adjacent to the top of the receptacle and downwardly adjacent to the bottom of the chamber B′ and below the level of the water contained therein. An outlet-pipe $B^4$ extends through the bottom of the chamber B′ and is provided with an outlet-aperture $B^5$ to permit the outflow of water from the chamber when the level therein rises beyond a predetermined limit.

A bell or dome C surrounds the upper portion of the carbid-receptacle A, and the lower end thereof extends downward within the body of water located in the lower portion of the casing B to prevent the escape of gas. This bell or dome is provided with a handle C′ to facilitate its removal when it is desired to remove the carbid-receptacle. A suitable cover D is also fitted above said handle, and a pivoted locking-bar D′ and spring-latch $D^2$ may be provided to hold the cover or dome in its position against the pressure of gas beneath the same. A suitable water-feed connection $B^6$ is provided at one side of the casing B for the introduction of water into the same.

The parts heretofore described may be used in connection with any form of water-feed device—for instance, that shown in the drawing, wherein a gasometer E is provided with a movable dome E′, carrying a suitable weight $E^2$ and provided at its lower portion with a drying-chamber $E^3$, adapted to contain any suitable substance for removing the moisture from the gas. A gas-inlet pipe F extends upward from this chamber, and a similar outlet-pipe F′′ extends downward from the upper part of the dome $E^2$. A guide-rod $F^2$ is supported from the chamber $E^3$ and operates in connection with a tubular guide $F^3$, carried by the dome E′. The gas is conveyed from the generating-chamber by a main or pipe G, which is connected with the outlet-pipe $B^4$, and any desired number of generators may be located upon this main, which at one end discharges the gas into the drying-chamber $E^3$. The main is also provided with a suitable water-trap G′, which permits the escape of water collected therein.

For the purpose of effecting the water-feed a water-chamber H is supported from a suitable support $E^4$ by means of a flexible cable or other connection H′, extending from the top of the dome and over suitable guide-pulleys E⁵. The lower portion of this water-chamber is provided with a flexible connection H², which communicates with a suitable opening in the side of the generating-chamber, so as to establish therein a water-level equal to that within the water-chamber. It will be seen that in the downward movement of the dome this chamber H will be elevated and the water-level within the generating-chamber thereby increased and the generation of gas started. The rising movement of the dome E' will effect the opposite operation and also the water-level within the generating-chamber, so that the generating operation is suspended.

From the foregoing description it will be seen that the water will pass over the upper end of the tube A', following the sides thereof and moistening the carbid at the base of the chamber. The movement of the water beneath the carbid-receptacle maintains the lower surface of the same in a cool condition, and the gas as generated passes beneath the dome C, thence downward through the gas-pipe B⁶ and water seal B' into the main G, from whence it is discharged into the gasometer, and from that point into the service system as desired. The increase or decrease of gas within this dome E' will effect the water-feeding operation, as hereinbefore described, and when the carbid-receptacle is removed from the generating-chamber for the purpose of recharging or cleansing the water seal in the chamber B' will prevent any escape of gas.

It is obvious that numerous changes may be made in the details of construction and configuration of the several parts without departing from the spirit of the invention as defined by the appended claim.

Having described my invention and set forth its merits, what I claim, and desire to secure by Letters Patent, is—

In a gas-generator, the combination of a casing having a water seal in its lower portion, a carbid-receptacle resting upon said seal and provided with an upward tubular extension, a gas-pipe extending through said tubular extension and terminating above the upper end of the same, the lower end of said pipe being submerged within the water seal, a discharge-pipe for said seal having an open end above the liquid-level of the seal and an outlet-aperture therein to permit the escape of water through said discharge-pipe, and a line-pipe provided with a trap to receive and retain water from said discharge-pipe; substantially as specified.

In testimony whereof I affix my signature in presence of two witnesses.

FRANK O. McQUEEN.

Witnesses:
SAMUEL B. WELLS,
HENRY R. GRINELLE.